United States Patent [19]

Martinez

[11] 4,415,814
[45] Nov. 15, 1983

[54] SYSTEM FOR THE GENERATION OF ELECTRICAL ENERGY BY UTILIZING AND CONTROLLING WIND ENERGY

[76] Inventor: José Martinez Parra, Calle Salitre 33-1°, Edificio Juan XXIII, Cartagena (Murcia), Spain

[21] Appl. No.: 286,188

[22] Filed: Jul. 23, 1981

[30] Foreign Application Priority Data

Sep. 25, 1980 [ES]  Spain ....................................... 495343

[51] Int. Cl.³ ................................................ F03D 7/06
[52] U.S. Cl. ....................................... 290/55; 415/2 R
[58] Field of Search .................... 290/44, 55; 415/2-4, 415/197 A

[56] References Cited

U.S. PATENT DOCUMENTS 4,164,382  8/1979  Mysels ................................... 290/44
4,269,563  5/1981  Sharak et al. .................... 416/197 A

FOREIGN PATENT DOCUMENTS 867380  2/1953  Fed. Rep. of Germany ..... 415/3 R

Primary Examiner—J. V. Truhe
Assistant Examiner—Shelley Wade
Attorney, Agent, or Firm—Bucknam and Archer

[57] ABSTRACT

The subject-matter of the present invention is a system for the generation of electrical energy by utilizing and controlling wind energy which comprises a domed building (3), in which the machine park for converting kinetic energy into electrical energy is located. Above the center of the domed building (3) a large impeller (5) is arranged whose motion is transmitted to the machine park via a central axis (6). Around and above the domed building and the impeller a superstructure is located which concentrates and channels the wind in the direction of the impeller (5), supports (22) with differently curved side walls separating the system into several sectors. At the accesses to the chamber (10) in which the impeller (5) is located gates (26) are provided by means of which the entry and exit of the wind is controlled; see FIG. 3.

3 Claims, 5 Drawing Figures

SYSTEM FOR THE GENERATION OF ELECTRICAL ENERGY BY UTILIZING AND CONTROLLING WIND ENERGY

BACKGROUND OF THE INVENTION

The subject-matter of the present invention is a system for the generation of electrical energy by utilizing and controlling wind energy.

The generation of electrical energy by converting the rotary movement of a rotor or impeller by means of a generator is known per se. If the kinetic energy to be used for the operation of the generator is to come from the wind, various difficulties arise which up to now have prevented the energy source wind from being technically utilized on a practical scale. A particular difficulty is the frequently irregular and insufficient force of the wind and the frequently varying directions from which it comes.

It is an object of the invention to provide a system for the generation of electrical energy by utilizing and controlling wind energy.

It is another object of the invention to provide a system which permits the generation of electrical energy even when the wind force is low.

It is a further object of the invention to provide a system which permits a satisfactory utilization of the wind energy independent of the wind direction. These and other objects and advantages of the invention will be evident from the following description of the invention.

SUMMARY OF THE INVENTION

The subject-matter of the invention is a system for the generation of electrical energy by utilizing and controlling wind energy which is characterized by a domed building upon which an impeller is mounted, whose axis penetrates the domed building at its highest point and transmits the motion of the impeller to an installation which converts the kinetic energy of the impeller into electrical energy, and by a superstructure provided around and above the domed building and the impeller which concentrates, regulates and controls the wind in the direction of the impeller which is located within a chamber forming part of the superstructure.

The system according to the invention enables the generation of electrical energy by utilizing and controlling the wind energy even when the wind force is normally not sufficient for economic generation of electrical energy. This is achieved by the large dimension superstructure which regulates and concentrates the wind in the direction of the impeller which is also relatively large. In the inventive system the wind thus strikes the impeller at elevated speed and intensity as compared to the surroundings. By means of the gates located at the accesses to the impeller chamber the entry of the wind can be controlled as desired. Finally, a particularly essential feature of the invention is that owing to the construction of the superstructure, especially the curvature of the side walls of the supports, the wind is led and concentrated in the direction of the concave surfaces of the impeller vanes. Finally, thanks to its construction, the impeller itself is an essential feature of the invention since for connecting the vanes to each other and with the horizontal axis it exhibits large dimension horizontal plates which at the same time act as flywheels. They provide the impeller with considerable inertia and thus ensure a number of revolutions of the impeller which is relatively independent of brief changes in the wind force and intensity.

BRIEF DESCRIPTION OF THE DRAWINGS

The accompanying figure schematically shows an embodiment of the system according to the invention.

DETAILED DESCRIPTION OF THE INVENTION

Figure 1:
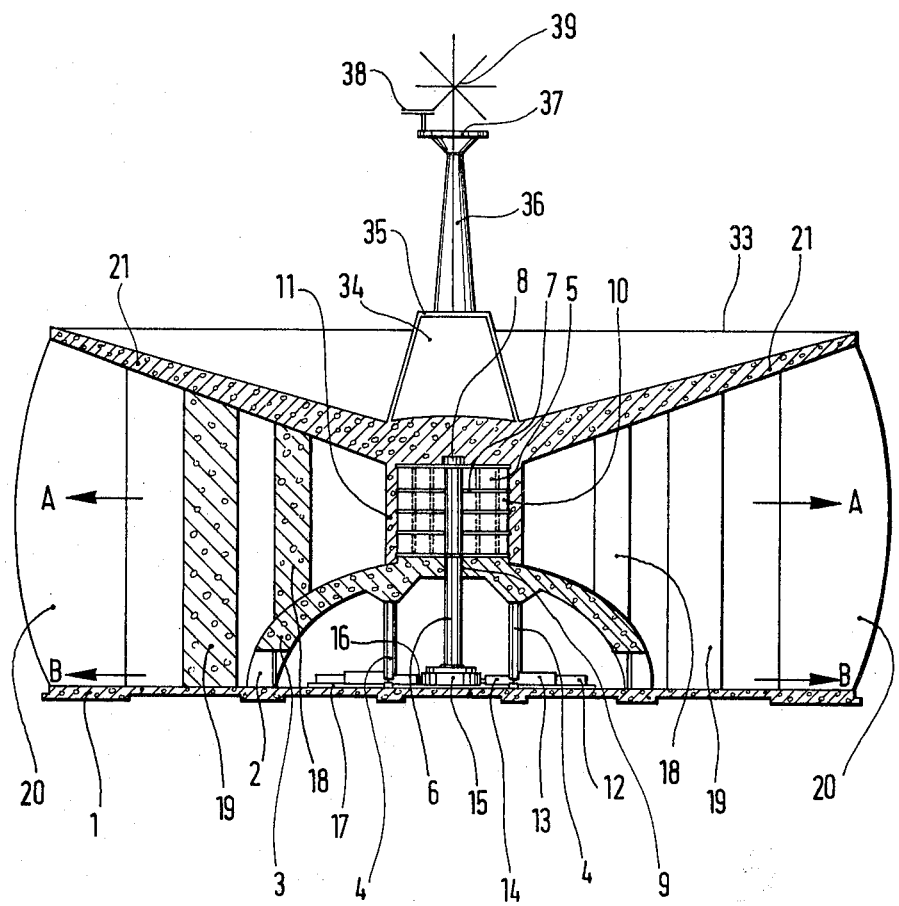
FIG. 1: a vertical section.

The inventive system for the generation of electrical energy by utilizing and controlling wind energy is preferably installed in locations known for their relatively strong wind.

The installations representing the total structure of the inventive system are arranged in and on a solid building which preferably consists of armored concrete and is divided into two main levels. The first level has a circular surface and its upright projection forms a large dome. The second level has a circular surface too and is superimposed upon and surrounds the former. The supports divide it into several, preferably four, sectors whose complete peripheral surface is open towards the outside.

The supports of the superstructure dividing it into sectors are in their outer part completely closed walls with straight vertical sides. To the extent that the walls converge radially in the direction of the center of the structure they divide into two walls each having differently curved shape. The two walls unite to one peripheral wall of a cylindrical large dimension chamber, which is located above the center of the dome of the main level and below the covering of the upper level. The curvatures of these walls deflect and concentrate the wind penetrating from outside towards the access to the cylindrical chamber. The large separation achieved between these walls gives the whole structure the necessary stability.

The peripheral wall of the cylilndrical chamber referred to above shows four apertures—one in each sector—located between the upper part of the dome of the lower level and the covering of the upper level and coinciding with the lines of the separating walls of the corresponding sectors. This arrangement results in a concentration of the wind forces absorbed, which are obtained at the aperture of any of the corresponding sectors For the control and regulation of the entry and exit of the wind which has to pass through the cylindrical chamber independent of the direction from which it comes, gates are provided, one to each sector. In the preferred embodiment with four gates the system according to the invention consequently contains four gates. The gates are opened and closed as necessay by means of mechanical or hydraulical means. These gates move on rails which for this purpose are arranged both at their lower and at their upper part.

Once the gates have moved and when they close they remain embedded between the separating walls of the sector.

When opened they disappear into a hollow between the separating walls of the corresponding sector. If, for example, the wind comes from the North and enters through the aperture of the sector oriented in this direction, its entry is regulated by the gate of this sector depending on its speed or force. The gates of the sectors oriented to the East and West remain closed and that of the Southern sector remains open to the degree required for a relatively constant number of revolutions of the impeller located in the mentioned chamber. This is the essential base for the generation of kinetic energy for the operation of the inventive system to generate electrical energy.

In the chamber in the center of the inventive system a large impeller is located which consists of dismountable parts. The impeller vanes are curved in the horizontal direction. They are connected with a dismountable axis and stiffened in a horizontal direction by means of large plates, preferably steel plates. These platelike stiffeners at the same time act as flywheels for the impeller.

The impeller is located in the chamber above the center part of the dome. It is connected with the covering of the upper level and forms part of the overall structure. The impeller is supported by several sliding bearings or steel rails which are anchored on the concrete structure in such a way that the friction on the rails is as little as possible.

The speed of the rotation of the impeller is transmitted to a central gear via a central vertical axis, which is held over its total length in several bearings. Said gear, like the remaining machine park for the generation of electrical energy, is situated on the floor of the main level within the dome. For this reason the vertical impeller axis penetrates this dome at its highest point.

The gear which takes up the motion of the impeller via its central axis in turn transmits it to one or two installations for the automatic control of the number of revolutions of the impeller and/or the following generators for the generation of electrical energy, so as to achieve optimum operating conditions with respect to the respective force of the wind. If these generators are direct-current generators they may be followed by electromechanic or electronic alternators such as transformers of direct or alternating current (direct current motor followed by an alternator) or inverted rectifiers. Preferably the number of revolutions of the generators for the generation of electrical energy should be constant and adopt a preset value. The generators for the generation of electrical energy which can be operated simultaneously or alternately, transmit the energy generated by them to a transformer park situated outside the system.

Of special importance in the inventive system is the construction of the superstructure and the impeller exhibiting the following main elements:

(a) The foundation and the upper surface of the domed building ascending from the outside towards the center of the system;

(b) The roof construction whose lower surface extends from the outside downwards towards the center of the system;

(c) The supports arranged perpendicularly between the foundation and the domed building, respectively, and the roof construction and connected therewith and extending radially from the outside towards the center of the installation;

(d) The impeller with vertical axis and vanes or shovels curved in horizontal direction, which is located in the center of the system between the domed building and the roof construction in a chamber which is partly limited by the walls of the supports;

(e) The different curvatures of the side walls of the supports which regulate and concentrate the wind in the direction of the concave surfaces of the impeller vanes;

(f) The gates located at the accesses to the chamber in which the impeller is housed and which, when opened or closed control the entry of the wind to the impeller, disappearing when opened into slots provided in the supports.

The above-described construction of the superstructure according to the inventive system allows, thanks to the large apertures of the sectors on its outer side, a large amount of wind to enter, whose motion or current is strongly accelerated by the rapid reduction of the cross-section of its flow path. This allows utilization of a large amount of kinetic energy to be economically converted into electrical energy even when the wind in the surroundings appears to be relatively weak.

The impeller in the center of the inventive system consists of dismountable elements. Its vanes or shovels are curved in the horizontal direction. Although their number is not particularly limited, impellers with a fairly large number of vanes are preferred, for example at least 10. An embodiment with 12 vanes is particularly preferred. The vanes are connected with their central impeller axis and horizontally stiffened by means of steel plates, which at the same time function as flywheels and give the impeller greater inertia. The number of these stiffening plates is not particularly limited either. For example one embodiment of the invention shows five such plates. At their lower edges the vanes are supported by bearings which guide the impeller when it moves rotationally. They are connected with the structure in such a way that the friction of the impeller on these rails is as little as possible, while at the same time the degree of security in guidance and stability achieved is very high.

The central impeller axis serves for the transmission of the kinetic energy of the impeller. With its upper end the axis is supported on a bearing housed within the roof construction. Below the impeller the axis penetrates the domed building. In this region too bearings are located for reducing the friction of the turning axis. The axis ends in the central gear of the machine park of the system.

The system according to the invention is illustrated by means of the embodiment shown in the drawing.

FIG. 1 is a vertical section of the center of the inventive system. Number 1 designates the armored concrete foundation of the system on which rest all parts. The inner part of the system is formed by a domed building 3 of armored concrete whose accesses have the number 2. In the interior of the domed building 3 a machine park is housed which is described later. The domed building 3 is supported by a plurality of posts 4, which also support the inner part of the superstructure described below.

Above the center part of the domed building 3 is located the impeller 5 with its central axis 6 which penetrates the domed building 3 at its central point. The impeller 5 exhibits a number of vanes or shovels which are curved in the horizontal direction. The vanes consist of metal, for example aluminum or steel. The number of the impeller vanes is not particularly limited. However in order to achieve a regular rotary movement and good utilization of the wind a fairly larg number of vanes, for instance 12, is preferred. By means of several horizontally arranged round plates the impeller vanes are connected to each other and to the central axis and at the same time stiffened. The plates 7 preferably consist of steel. As they act as flywheels these plates, apart from reinforcing and stiffening the impeller, increase its inertia. Thus even when the wind direction and intensity change briefly a relatively constant rotary movement of the impeller is ensured. The number of the plates 7 used is not particularly limited either. It depends on the impeller size. For example an embodiment with five horizontal plates 7 is preferred.

The upper end of the vertical axis 6 of the impeller 5 is located in the bearing 8 in the cover of the superstructure. At the point where the axis penetrates the domed building 3 bearings 9 are provided, which—like the bearing 8—are to ensure the smallest possible friction when the axis moves.

The axis 6 transmits the motion of the impeller 5 to the gear 15 which represents the central part of the machine park for the generation of electrical energy housed in the interior of the domed building 3. From the gear 15 extends a horizontal axis 16 via which the motion of the gear 15 is transmitted to the installations 14 for the automatic control of the number of revolutions and from here to the generators for the generation of electrical energy. 12 designates alternators connected to the generators. The complete machine park rests on an isolated platform 17 which in particular absorbs vibrations.

The superstructure which, apart from the domed building and the impeller 5 with axis 6, represents the third essential part of the inventive system, mainly consists of pillars 18, 19 and 20, supports 22 and the roof construction 21. These parts are preferaby made of armored concrete. They all rest on the foundation 1. The interior pillars 18, intermediate pillars 19 and outer pillars 20 serve as supports for the roof construction 21 and thus stabilize the whole superstructure. The roof construction 21 consists of armored concrete ribs which extend downwards towards the center of the superstructure in a funnel-like manner. 33 designates its upper limitation.

The supports 22 are of special importance within the superstructure. They too rest on the foundation 1 and extend vertically to the roof construction 21. Preferably four such supports 22 are provided which divide the inventive system into four sectors; see FIG. 3. At the outer circumference of the system the supports 22 represent a single wall dividing radially in the direction of the center of the system and extending as two walls with differently curved shapes towards the chamber in which the impeller 5 is located. In front of this chamber 10 the two walls reunite and thereby form the sections 11 of the limitation of the chamber 10 of the impeller 5. Thus in the cross-sectional view the supports 22 have approximately teardrop shape. The side walls 23 of the supports 22 are straight in the vertical direction but curved in the horizontal direction. This curvature is different on the two sides of a support 22. Its shape is such that the wind is led in a particularly favorable manner towards the concave surfaces of the vanes of the impeller 5.

Apart from stiffeners which render the supports 22 stable their interior is hollow. These hollows in the supports 22 serve, among other things, to take up the gates 26 provided for controlling the entry and exit of the wind to and from the chamber in which the impeller 5 is located. Thanks to their outer shape which concentrates the wind in the direction of the vanes of the impeller 5 and thanks to their function of taking up the gates the supports 22 which consist of armored concrete represent an essential part of the inventive system. Furthermore they contribute to the increase in stability of the superstructure.

Figure 2:
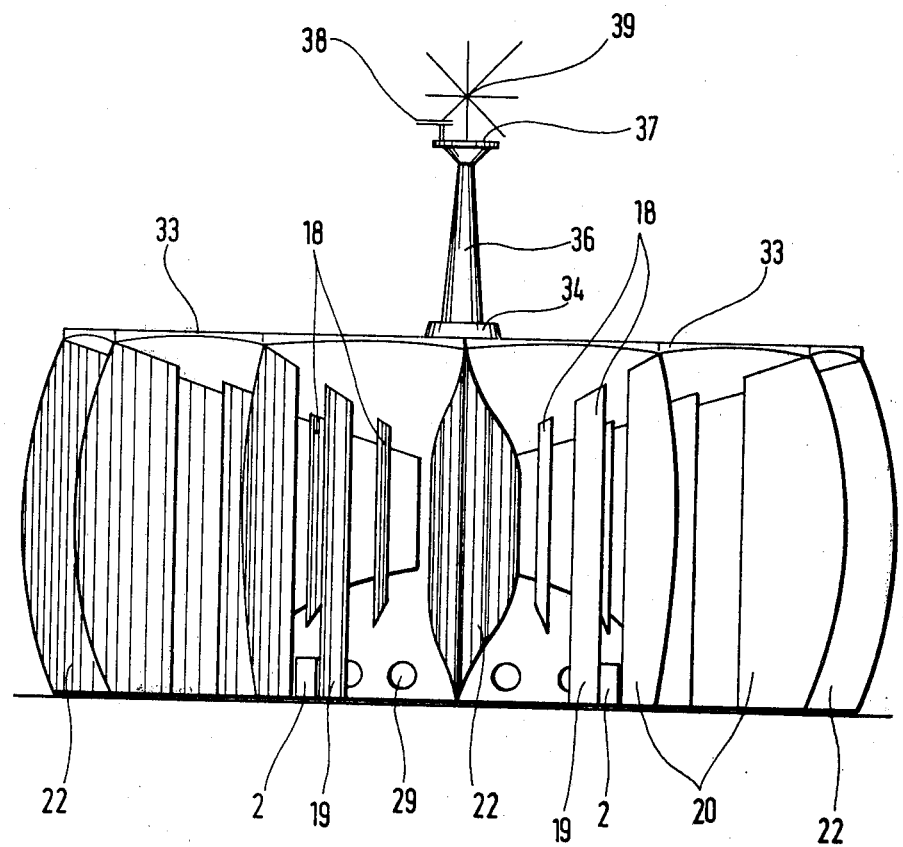
FIG. 2: a side view.

FIG. 2 is a side view of the system according to the invention. In the middle lower part of this Figure the domed building 3 with its accesses 2 and the apertures for light and ventilation 29 can be seen. Above and around the dome is arranged the superstructure with the inner pillars 18, the intermediate pillars 19 and the outer pillars 20. This Figure further shows three supports 22, the one located in the middle exhibiting the different curvature of the side walls.

Figure 3:
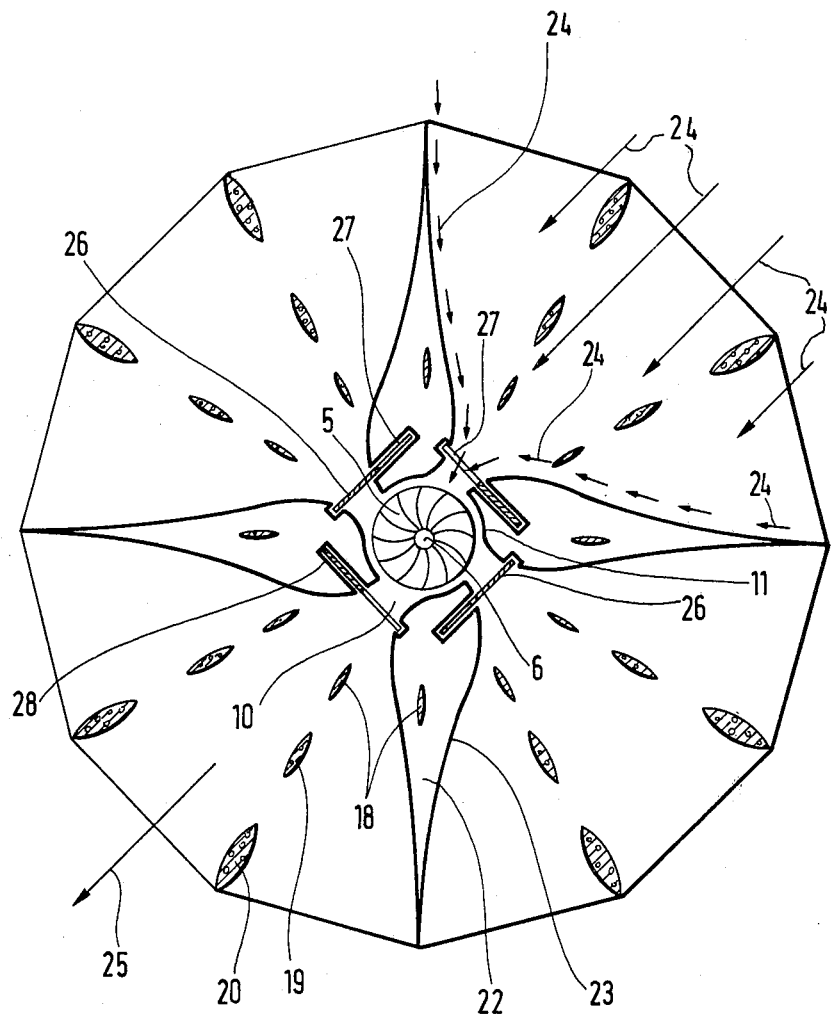
FIG. 3: a horizontal section of the system at the height of line A—A in FIG. 1,
FIG. 4: a horizontal section of the system at the height of line B—B of FIG. 1, and
FIG. 5: a top view of the system according to the invention.

FIG. 3 is a horizontal section of the inventive system at the height of the impeller 5, i.e. above the domed building 3. This Figure too shows the inner, intermediate and outer pillars 18, 19 and 20 and the supports 22. FIG. 3 further shows a possible current path of the wind. The wind coming from any direction enters one (or two) of the four sectors drawn there of the superstructure which are in each case formed by two supports 22. In FIG. 3 the wind direction is marked by the arrows 24. By means of the extension of the vertical walls 23 of the supports 22 the wind is concentrated and channeled in the horizontal direction, by means of the ascending profile of the domed building 3 and the roof construction 21 extending downwards in a funnel-like manner in the vertical direction.

In the area where the vertical walls 23 of two adjacent supports 22 approach particularly closely, i.e. in front of the chamber 10 in which the impeller 5 is located, gates 26 are provided by means of which the entry and exit can be controlled of the wind to and from the chamber 10 in which the impeller 5 is located. The gates 26 are preferably designed as sliding gates moving on rails 27. When the gates 26 are opened to let the wind enter they disappear in slots 28 situated within the hollow of the supports 22. The number 25 in FIG. 3 designates the direction of the wind leaving the inventive system.

Figure 4:
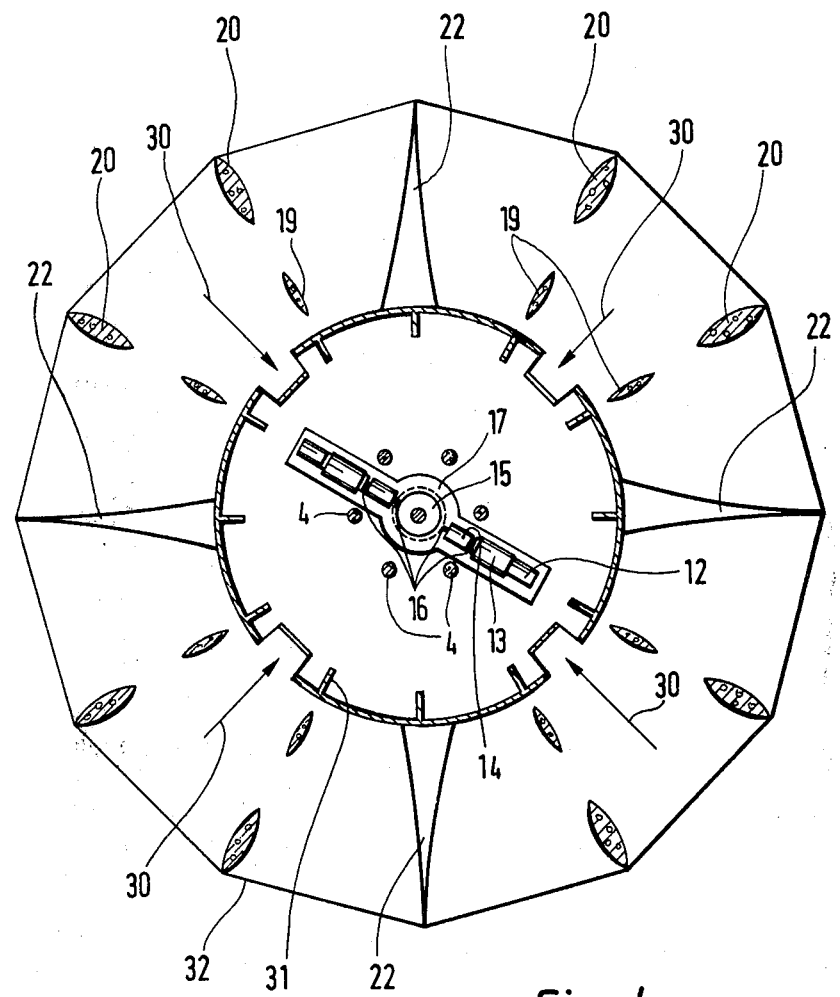

FIG. 4 is a horizontal section of the inventive system at the height of the floor. The inner area of FIG. 4 shows the circumference of the domed building 3 with accesses 30. The dome itself is reinforced by armored concrete ribs 31. In the cross-sectional view the posts 4 can be seen which carry the weight of the domed building 3 and the central part of the superstructure. In the center the machine park is situated having constituent parts 12 to 17. In FIG. 4 the number 32 designates the line of the outer border of the system according to the invention.

Figure 5:
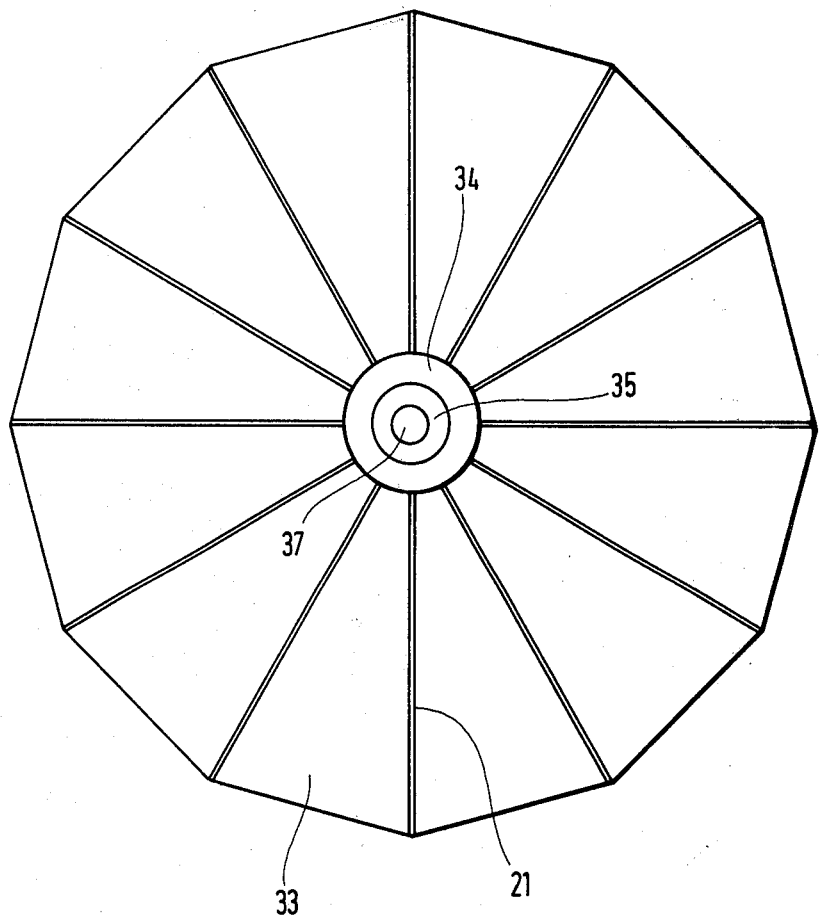

FIG. 5 is a top view of the system according to the invention. This Figure shows the ribs of the roof construction 21. As in FIGS. 1 and 2 the number 33 designates the horizontal cover of the armored concrete superstructure. in the center of this upper cover 33 a chamber 34 is located for weather observation and signaling. This chamber is sealed by the cover 35. A pillar 36 towers over the chamber 34; said pillar carries a platform 37 for measuring, signaling and indicating instruments. 38 is an apparatus for measuring the wind speed and 39 is an antenna for signaling.

The example illustrates the invention.

EXAMPLE

In a concrete embodiment the inventive system consists of a domed building having at its base an inner diameter of 90 m and a maximum inner height of 27 m. Above the center part of the domed building an impeller is mounted, which consists of dismountable parts and has a diameter of 26 m and a height of 22 m. The impeller comprises 12 vanes.

The superstructure has a diameter of about 200 m. Four supports divide it into four sectors. Thus the surface of a sector which is open to permit the entry of the wind is 142 m broad and 84 m high, i.e. has a surface area of 11,928 $m^2$.

The aperture at the access to the chamber in which the impeller is located is 8 m broad and 22 m high. Its surface area thus amounts to 198 $m^2$. This means that using this system the wind is concentrated by about 60 times in the direction of the impeller vanes.

I claim:

1. A system for the generation of electrical energy by utilizing and controlling wind energy, which comprises a domed building (3) on which an impeller (5) is mounted, the axis of said impeller penetrating the domed building at its highest point and transmitting the motion of the impeller to an installation for converting the kinetic energy of the impeller into electrical energy, a superstructure located around and above the domed building and the impeller, the superstructure consists of pillars (18, 19, 20), a roof construction (21) and supports (22), the supports are straight in a vertical sense and, divide the superstructure into several sectors, represent at the outer circumference of the superstructure a single wall which towards the center of the superstructure divides into two walls which reunite in front of the impeller located in the center of the superstructure, thus defining a central chamber in which the impeller is located, the vertical walls of the supports are differently curved so that they lead and concentrate the wind onto the concave surfaces of the impeller, and closing means for the aperture between the surface of the domed building, the opposing vertical walls (23) of two supports and the roof construction being located at the access to the chamber in which the impeller is located, said closing means consisting of sliding gates movable in the horizontal direction and the supports are provided with slots, said gates sliding into said slots when they are opened.

2. A system according to claim 1 characterized in that the superstructure is divided into four sectors by four supports which concentrate the wind conducting it to the entrance of the chamber in which the impeller is located and lead it out through the opposite sector.

3. A system according to claim 1 wherein the impeller consists of dismountable vanes curved only in one direction and the impeller comprises horizontal plates connecting said vanes to each other and to said axis.

* * * * *